United States Patent [19]

Gottesfeld

[11] Patent Number: 4,910,099
[45] Date of Patent: Mar. 20, 1990

[54] PREVENTING CO POISONING IN FUEL CELLS

[75] Inventor: Shimshon Gottesfeld, Los Alamos, N. Mex.

[73] Assignee: The United States of America as represented by the United States Department of Energy, Washington, D.C.

[21] Appl. No.: 279,694

[22] Filed: Dec. 5, 1988

[51] Int. Cl.[4] .............................................. H01M 8/04
[52] U.S. Cl. ......................................... 429/13; 429/17
[58] Field of Search ........................ 429/13, 17, 19, 20

[56] References Cited

U.S. PATENT DOCUMENTS 4,309,359  1/1982  Pino ...................................... 518/705
4,650,727  3/1987  Vanderborgh et al. ............. 429/19

OTHER PUBLICATIONS

T. Engel et al., "Oxidation of Carbon Monoxide." *The Chemical Physics of Solid Surfaces and Heterogeneous Catalysis*, pp. 73–92, Elsevier Scientific Publishing Company, 1982.

Edson A. Ticianelli et al., "Localization of Platinum in Low Catalyst Loading Electrodes to Attain High Power Densities in SPE Fuel Cells." Los Alamos National Laboratory report LA-UR-88-121.

E. A. Ticianelli et al., "Electrode Materials and Processes for Energy Conversion and Storage," The Electrochemical Society, Inc., Proceedings vol. 87-12, pp. 166–175 (1987).

Shimson Gottesfeld et al., "A New Approach to the Problem of Carbon Monoxide Poisoning in Fuel Cells Operating at Low Temperatures," J. Electrochem. Soc. 135 No. 10, pp. 2651-2652 (Oct. 1988).

*Primary Examiner*—Anthony Skapars
*Attorney, Agent, or Firm*—Ray G. Wilson; Paul D. Gaetjens; William R. Moser

[57] ABSTRACT

Proton exchange membrane (PEM) fuel cell performance with CO contamination of the $H_2$ fuel stream is substantially improved by injecting $O_2$ into the fuel stream ahead of the fuel cell. It is found that a surface reaction occurs even at PEM operating temperatures below about 100° C. to oxidatively remove the CO and restore electrode surface area for the $H_2$ reaction to generate current. Using an $O_2$ injection, a suitable fuel stream for a PEM fuel cell can be formed from a methanol source using conventional reforming processes for producing $H_2$.

14 Claims, 4 Drawing Sheets

PREVENTING CO POISONING IN FUEL CELLS

BACKGROUND OF INVENTION

This invention relates to fuel cells and more particularly, to fuel cells using hydrogen as a fuel with a reaction catalyst which adsorbs carbon monoxide (CO). This invention is the result of a contract with the Department of Energy (Contract No. W-7405-ENG-36).

Fuel cells generally produce useful electrical energy by providing fuel to an anode and an oxidizer to a cathode. wherein reactions on the electrodes generate a current flow therebetween. The electrodes typically contain a catalyst, e.g. platinum (Pt). to promote the reactions occurring at the electrodes. The efficacy of the catalyst is greatly affected by contaminants which adhere to the surface of the catalyst to block hydrogen adsorption onto the catalyst. More particularly, CO strongly adsorbs onto Pt at temperatures below about 150° C. to effectively poison the hydrogen reaction at low operating temperatures.

It will be appreciated that this CO poisoning occurs at even low levels of CO. FIG. 1 illustrates the performance of a proton exchange membrane (PEM) fuel cell with CO levels from 5-100 ppm (0.0005-0.01%) in the hydrogen fuel stream. A fuel cell which would be useful for commercial applications would preferably be tolerant of CO levels produced in a relatively uncomplicated fuel system. i.e., 100 ppm or greater.

One fuel system under consideration is a methanol reformation system. Methanol is a readily available and easily transportable fuel. A system which is effective to generate a fuel stream from methanol is described in U.S. Pat. No. 4,650,727, issued Mar. 17, 1987, to Vanderborgh et al. and incorporated herein by reference. However, conventional reformers provide a hydrogen fuel stream with greater than 0.05% CO, a substantially unusable concentration in current PEM fuel cells.

Attempts have been made to further reduce the CO concentration, and particularly through a selective oxidation process for the CO. Conventional,. the oxidation of CO to $CO_2$ occurs in the presence of a catalyst and at temperatures above 150° C., i.e., in the range of 175° C. The output from a selective oxidation process still has CO concentrations up to 0.01%.

PEM fuel cells, which have potential application in mass transportation. are very sensitive to CO poisoning, as shown by the FIG. 1 performance curves. Conventional membranes, such as the Dupont Polymer Nafion ® must contain significant amounts of water to conduct protons from the electrode reactions. Accordingly, PEM fuel cells cannot operate at temperatures over about 100° C., and preferably operate at temperatures around 80° C. At these operating temperatures. CO strongly adsorbs to !he Pt catalyst to poison the fuel cell performance, as shown in FIG. 1.

Phosphoric acid fuel cells can operate at temperatures above 150° C. where the CO adsorption and concomitant poisoning is greatly reduced. However, poisoning effects still occur at somewhat higher CO levels. Further, phosphoric acid systems could benefit from operating at lower temperatures to achieve shorter start-up times, and lower corrosion rates.

Accordingly, it is highly desirable to improve fuel cell performance with levels of CO in the fuel stream which have not heretofore been tolerable. The present invention allows PEM fuel cells to obtain a performance level a wide range of CO concentrations which is substantially improved, approaching the performance levels obtainable with a pure hydrogen fuel stream.

Accordingly, it is an object of the present invention to enable a PEM fuel cell to be used with a methanol fuel source.

It is another object of the present invention to enable a PEM fuel cell to maintain substantially uneffected performance cover a wide range of CO concentrations.

One other object of the preset invention is to improve the CO tolerance of phosphoric acid fuel cells.

Yet another object of the present invention is to substantially restore PEM fuel cell performance with CO levels of 100-500 ppm to the performance level without CO.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method of this invention may comprise injecting oxygen into a hydrogen fuel stream containing a concentration of CO. The amount of injected oxygen ($O_2$) is functionally determined to substantially improve the fuel cell performance toward the performance with a pure hydrogen fuel. It is believed that the electrical potentials at the fuel cell anode provide some hydrogen sites on the catalyst which react with the injected hydroxyl to provide hydroxyl adjacent the catalytic surface for oxidatively reacting with the adsorbed CO to restore surface area on the catalyst. Experimental results have demonstrated that the injection of $O_2$ substantially improves PEM fuel cell performance over a wide rane of CO concentrations, and particularly those concentrations which can be obtained from conventional methanol reforming systems.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
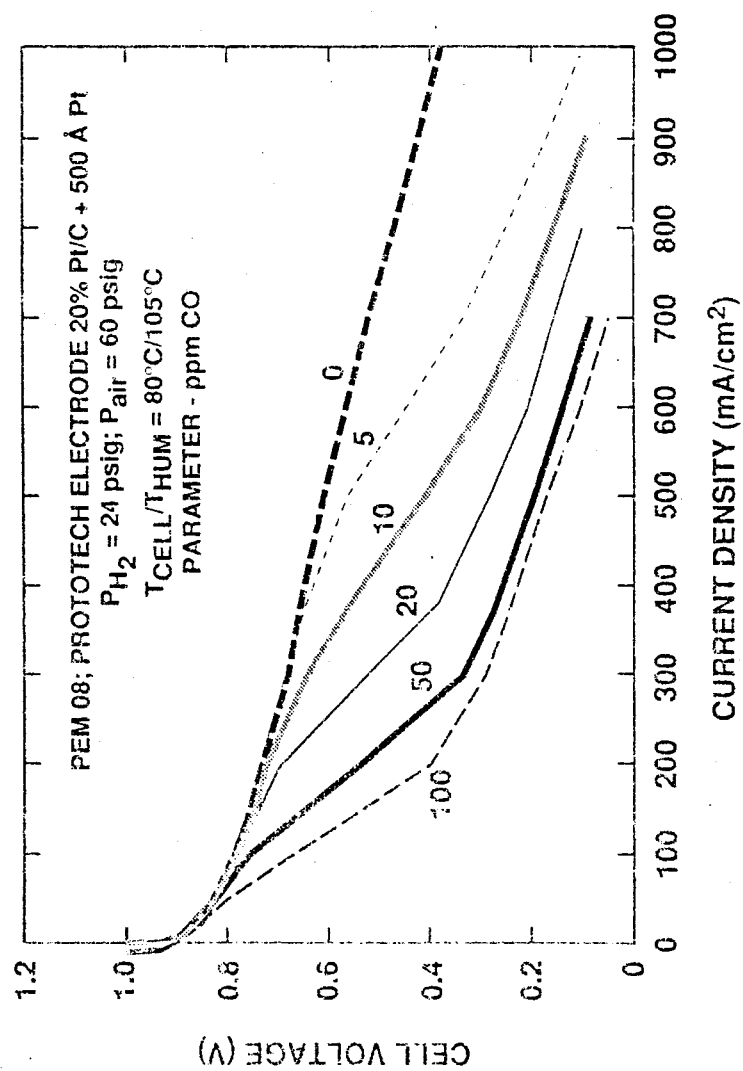
FIG. 1 depicts the performance of a PEM fuel cell at various CO concentrations up to 100 ppm.

In accordance with the present invention, it has been found that a concentration of $O_2$ added to an $H_2$ fuel stream can be found which will substantially improve PEM fuel cell performance where the fuel provided to the anode has a level of CO otherwise sufficient to reduce or poison fuel cell performance. At very high levels of CO, higher concentrations of $O_2$ have to be used for performance restoration, resulting in reduced system efficiency since the excess $O_2$ reacts with the $H_2$ to reduce the fuel available for electrical current generation. However, such very high levels of CO do not occur with conventional methanol reformer fuel systems.

It is known that low temperature adsorption, i.e., adsorption at less than about 150° C., of CO onto a conventional fuel cell catalyst, such as Pt, essentially blocks the reaction promoted by the catalyst. For PEM fuel cells, and other low temperature fuel cells, it was not expected that the injected $O_2$ would react with the adsorbed CO at the low operating temperatures, and particularly below 100° C. Thus, it was surprising to find that the CO could be oxidized at the anode of an operating fuel cell at temperatures below 100° C.

In a fuel cell, relative electrical potentials of less than 0.3 V are produced at the anode, resulting in the discharge of $H_2O$ adjacent the anode. The resulting hydrogen is adsorbed onto the catalyst surface, occupying potential sites for CO adsorption. The injected $O_2$ may then react with the adsorbed hydrogen to provide OH groups at the surface to oxidatively react with CO. $CO_2$ may by formed, which releases from the catalytic surface to restore surface area for the hydrogen reaction which generates fuel cell current. Thus. in accordance with the present invention. it was recognized that the ability of the surface hydrogen to initially displace some CO from the catalytic surface enables the injected $O_2$ to react with adsorbed H, forming OH on the surface for a surface reaction with CO without requiring high temperatures above where a PEM fuel cell cannot operate because of water loss.

FIGS. 1-4 illustrate PEM fuel cell performance at various CO concentrations with and without the injection of $O_2$. The PEM fuel cell used for the experiments included a Nafion ® membrane and Prototech electrodes with a catalyst layer of 20% Pt/C, modified by depositing a 500 Å layer of Pt, for a total catalyst loading of about 0.4 mg per $cm^2$. In a further modification, the electrodes are impregnated with a proton conductor, such as Nafion ®. The construction of these electrodes is described by E. A. Ticianelli et al., "Electrode Materials and processes for Energy Conversion and Storage," The Electrochemical Society, Inc. Proceedings, Vol. 87-12, p . 166-175, and is not a part of the present invention.

The operating conditions for the fuel cells used in connection with FIGS. 1-4 include pressurized fuel and oxygen (air) supplies to 24 psig and 60 psig, respectively, or as noted on the figures; cell and humidifier temperatures of 80° C. and 105° C., respectively. Additional $O_2$ was injected into the $H_2$ supply line prior to the humidifier for reaction in the fuel cell downstream of the humidifier. The location of the $O_2$ addition is not important to the present invention, but was selected for access and other mechanical reasons. It will also be appreciated that air can be injected to form the $O_2$ supply.

Referring first to FIG. 1, there is graphically illustrated the performance of a PEM fuel cell at various CO concentrations up to 100 ppm. The reference performance is the 0% CO, or pure $H_2$ operating line. The degradation in performance is readily apparent. The PEM fuel cell has unacceptable performance at the CO levels (e.g., 50-100 ppm) expected from conventional methanol reforming operations, even with selective oxidation of CO.

Figure 2:
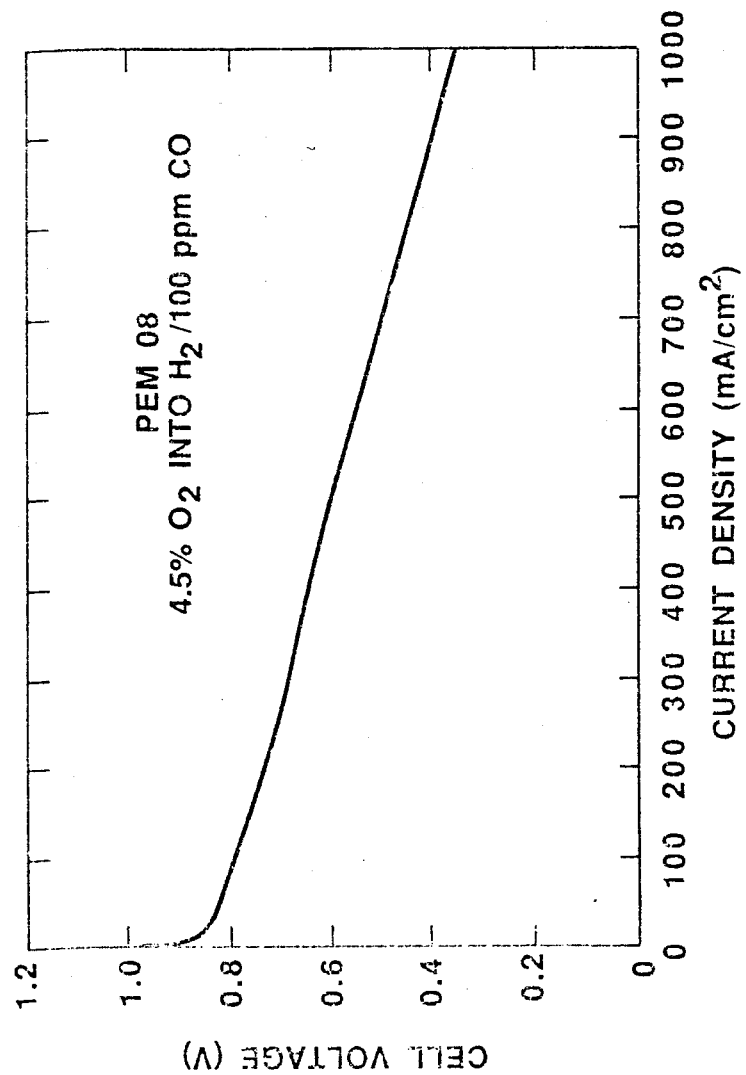
FIG. 2 depicts the performance of the fuel cell shown in FIG. 1 with 100 ppm CO with 4.5% $O_2$ injected into the $H_2$ fuel stream.

FIG. 2 depicts the performance of the same fuel cell illustrated in FIG. 1 with 100 ppm CO in the H fuel stream. However, 4.5% $O_2$ was injected into the $H_2$/CO fuel stream as hereinabove discussed. It is readily apparent that the fuel cell performance is substantially returned to the pure $H_2$ (0 ppm CO) performance.

Figure 3:
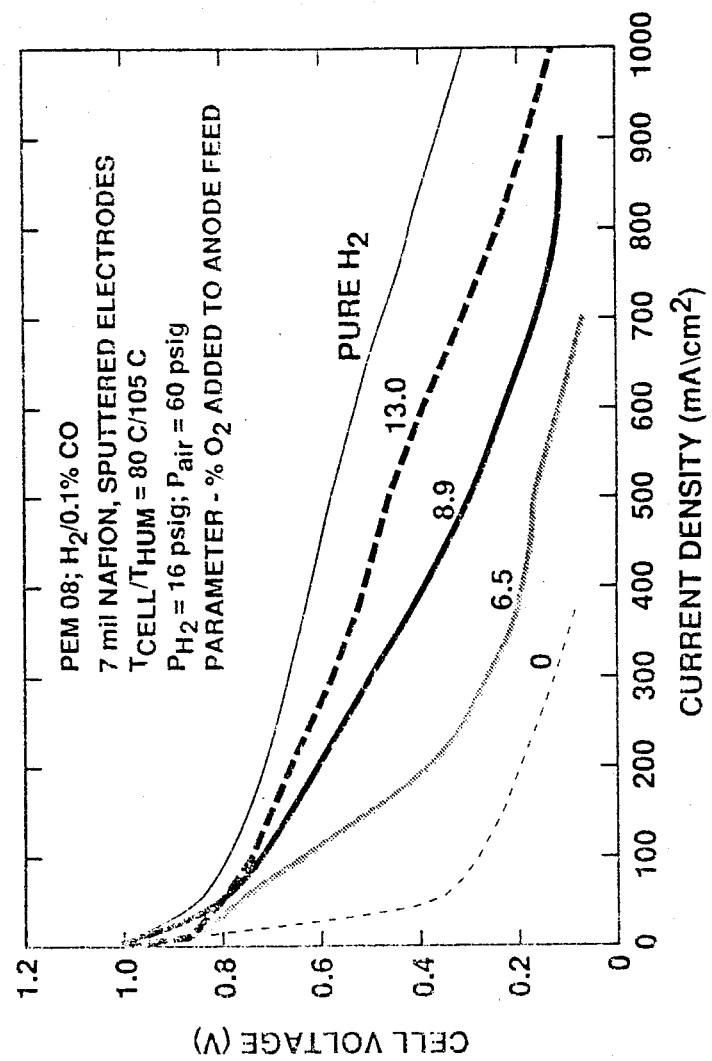
FIG. 3 shows the performance of the ful cell shown in FIG. 1, with 1,000 ppm CO and injected oxygen levels up to 13%.

FIG. 3 depicts the performance of the PEM fuel cell of FIG. 1, but with 0.1% (1,000 ppm) CO in the $H_2$ fuel stream. Fuel cell performance with increasing additions of $O_2$ is depicted. Fuel cell performance was substantially improved with the addition of 13% oxygen. although the experiment depicted in FIG. 3 did not attempt to completely restore performance. Indeed, at the $O_2$ injection levels needed for hiqh concentrations of CO, some loss in efficiency may be inherent due to the reaction between $H_2$ and $O_2$ removing $H_2$ from the fuel stream. However, adjusting the $H_2$ and $O_2$ supplies may enable performance to be substantially restored.

The fuel cell performance depicted in FIG. 3 was obtained at a cell operating temperature of 80° C. The surface reactivity between $O_2$ and CO is known to increase considerably as the reaction temperature increases from 80° C. to 100° C. It is possible that raising the fuel cell operating temperature toward 100° C. may provide performance improvements for a given injection of $O_2$ with increased CO levels. It would be desirable to enable operation of a PEM fuel cell at surface CO levels associated with the direct reformation of methanol, i.e., the direct use of methanol as a fuel.

Figure 4:
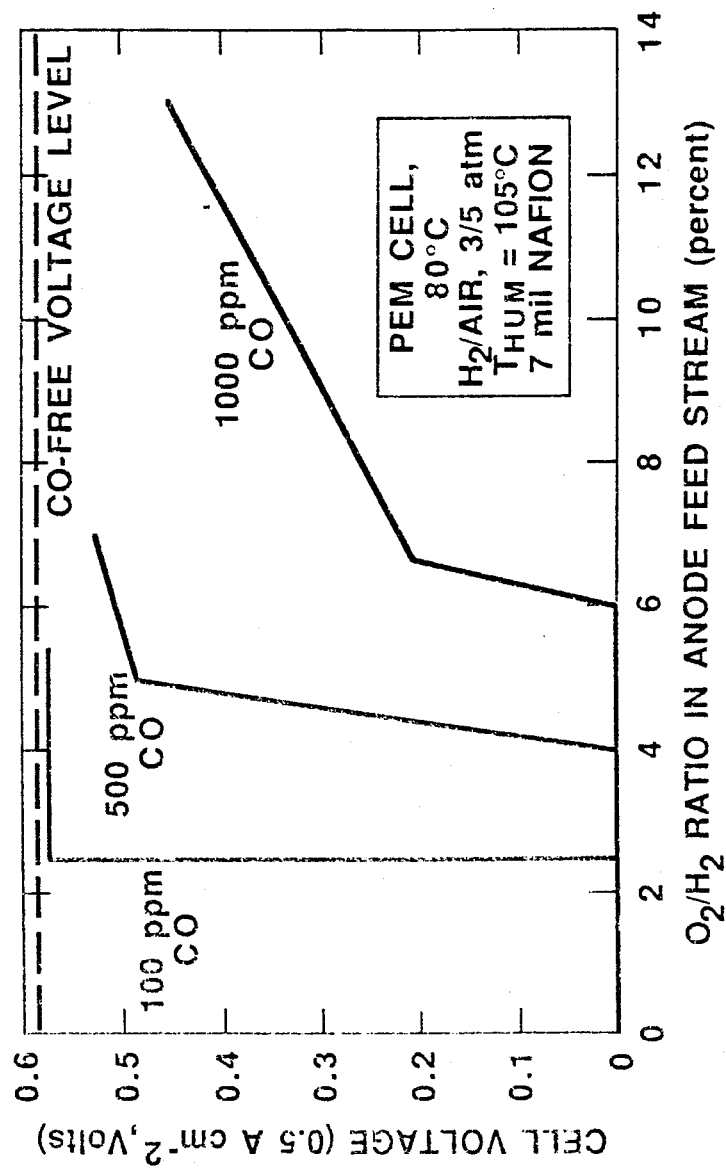
FIG. 4 graphicalyy illustrates fuel cell performance improvements at various CO levels as a function of injected oxygen.

FIG. 4 further depicts the substantial fuel cell performance improvement obtained by injecting $O_2$ according to the present invention. A PEM fuel cell was selected generally identical with the fuel cell used to derive FIGS. 1-3 and operated at a current density of 0.5 A/$cm^2$ and the cell voltage was determined. The substantial performance improvements are apparent for contamination levels of CO up to 1000 ppm (0.10%). Fuel cell performance is improved to a selected level relative to performance of the cell with pure $H_2$, i.e., CO-free fuel, by adjusting the concentration of $O_2$ added to the fuel feed stream prior to the fuel cell. Indeed, at concentration levels of 100-500 ppm CO, available from conventional methanol reformation systems, fuel cell performance can be substantially restored to the CO-free performance level with the injecte $O_2$ forming 2-6% by volume of the fuel stream.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for minimizing the effects of CO poisoning in a fuel cell having a catalytic electrode structure, comprising the step of:

injecting into an $H_2$ fuel stream containing a concentration of CO upstream of said fuel cell an amount of $O_2$ for oxidatively reacting with said CO adjacent said electrode structure of said fuel cell at temperatures less than about 160° C., wherein said amount of $O_2$ is functionally determined to substantially improve said fuel cell performance toward pure $H_2$ performance levels.

2. A method according to claim 1, including the step of generating said fuel stream from methanol.

3. A method according o claim 1, wherein said concentration of CO is 100-500 ppm and said volume percent of injected $O_2$ is about 2-6%.

4. A method according to claim 2, wherein said concentration of CO is 100-500 ppm and said volume percent of injected $O_2$ is about 2-6%.

5. A method according to claim 1, wherein said fuel cell is a PEM fuel cell.

6. A method according to claim 5, including the step of generating said fuel stream from methanol.

7. A method according to claim 5, wherein said concentration of CO is 100-500 ppm and said volume percent of injected $O_2$ is about 2-6%.

8. A method according to claim 6, wherein said concentration of CO is 100-500 ppm and said volume percent of injected $O_2$ is about 2-6%.

9. A method according to claim 5, wherein said $O_2$ is injected upstream of a humidifier for said fuel stream.

10. A method according to claim 5, wherein said temperature does not exceed about 100° C.

11. A method for minimizing the effects of CO poisoning in a fuel cell having a catalytic electrode structure, comprising the step of injecting $O_2$ upstream of said fuel cell in an amount effective to restore the performance of said fuel cell to a selected level relative to the performance of said cell with pure $H_2$.

12. A method according to claim 11, further including the step of generating a fuel stream from methanol comprising $H_2$ with CO contamination.

13. A method according to claim 12, wherein said fuel cell is a PEM fuel cell.

14. A method according to claim 13, wherein the operating temperature of said fuel cell is less than 100° C.

* * * * *